United States Patent
Naderer

(10) Patent No.: US 9,855,636 B2
(45) Date of Patent: Jan. 2, 2018

(54) APPARATUS FOR ROBOT-SUPPORTED ABRASIVE MACHINING

(71) Applicant: FerRobotics Compliant Robot Technology GmbH, Linz (AT)

(72) Inventor: Ronald Naderer, Sankt Florian (AT)

(73) Assignee: FerRobotics Compliant Robot Technology GmbH, Linz (AT)

( * ) Notice: Subject to any disclaimer, the term of this patent is extended or adjusted under 35 U.S.C. 154(b) by 0 days.

(21) Appl. No.: 14/978,501

(22) Filed: Dec. 22, 2015

(65) Prior Publication Data

US 2016/0176015 A1 Jun. 23, 2016

(30) Foreign Application Priority Data

Dec. 23, 2014 (DE) .................. 10 2014 119 532

(51) Int. Cl.
| | |
|---|---|
| *B24B 49/00* | (2012.01) |
| *B24B 49/16* | (2006.01) |
| *B25J 9/16* | (2006.01) |
| *G05B 19/416* | (2006.01) |

(52) U.S. Cl.
CPC ............ *B24B 49/006* (2013.01); *B24B 49/16* (2013.01); *B25J 9/1694* (2013.01); *G05B 19/416* (2013.01); *G05B 2219/40071* (2013.01); *G05B 2219/43132* (2013.01); *G05B 2219/45058* (2013.01)

(58) Field of Classification Search
CPC ....... B24B 47/22; B24B 47/25; B24B 49/006; B24B 49/16; B24B 51/00; G05B 2219/43132; G05B 2219/45058
See application file for complete search history.

(56) References Cited

U.S. PATENT DOCUMENTS

| | | | |
|---|---|---|---|
| 5,077,941 A | 1/1992 | Whitney | |
| 5,299,339 A | 4/1994 | Yonaha et al. | |
| 5,427,564 A | 6/1995 | Whittington et al. | |
| 6,402,595 B1 | 6/2002 | Fiesser | |
| 7,130,718 B2 * | 10/2006 | Gunnarsson | ........... B25J 9/1638 |
| | | | 219/124.1 |
| 7,869,898 B2 * | 1/2011 | Scholich-Tessmann | G05B 19/404 |
| | | | 700/192 |
| 9,393,687 B2 * | 7/2016 | Hietmann | .............. B25J 9/0081 |
| | (Continued) | | |

FOREIGN PATENT DOCUMENTS

| | | |
|---|---|---|
| CN | 203045450 U | 7/2013 |
| CN | 103429400 A | 12/2013 |
| | (Continued) | |

*Primary Examiner* — Timothy V Eley
(74) *Attorney, Agent, or Firm* — Murphy, Bilak & Homiller, PLLC

(57) ABSTRACT

A robot-supported grinding method is described. In accordance with one example of the invention, the grinding method includes contacting a surface of a workpiece with a rotating grinding tool, whereby either the grinding tool or the workpiece is mechanically coupled to the tool center point (TCP) of a manipulator. The method further includes controlling an actuator that influences the grinding tool or the workpiece to produce a grinding force between the grinding tool and the workpiece, as well as measuring an actual deflection of the actuator. The rotational velocity of the grinding tool is adjusted depending on the measured actual deflection of the actuator and a reference deflection of the actuator.

9 Claims, 3 Drawing Sheets

(56) References Cited

U.S. PATENT DOCUMENTS

| | | | |
|---|---|---|---|
| 2010/0178123 A1* | 7/2010 | Ladra | B23Q 1/70 409/141 |
| 2013/0228031 A1 | 9/2013 | Gerat et al. | |
| 2014/0005831 A1 | 1/2014 | Naderer et al. | |
| 2016/0136709 A1* | 5/2016 | Naderer | B21D 39/023 72/214 |

FOREIGN PATENT DOCUMENTS

| | | | |
|---|---|---|---|
| DE | 235740 A1 | 5/1986 |
| DE | 4495553 T1 | 10/1996 |
| JP | H0352640 A | 2/1996 |

\* cited by examiner ness, between the deflection and the contact pressure varies during the grinding process (e.g., with temperature, wear, etc.). With a force-controlled actuator — as will be explained later on — the actual deflection is relevant, as it characterizes the position of the grinding tool.

APPARATUS FOR ROBOT-SUPPORTED ABRASIVE MACHINING

PRIORITY CLAIM

This application claims priority to German Patent Application No. 10 2014 119 532.9 filed on 23 Dec. 2014 the content of said application incorporated herein by reference in its entirety.

TECHNICAL FIELD

The invention relates to the field of robot-supported apparatuses machining (particularly grinding and sanding), their set-up and manufacturing process.

BACKGROUND

The robot-supported apparatuses for abrasive machining, particularly grinding and sanding apparatuses that are presently on the market can only satisfy the demands for high quality surface finishing with great amounts of additional (manual) labor. In the following, the term grinding is used as collective term for grinding and similar abrasive processes (like sanding and polishing), in which material is abraded from a workpiece surface by a rotating tool. The grinding results depend greatly on the degree of contact pressure that the grinding tool (wheel or disk) places on the workpiece, as well as on the circumferential velocity of the grinding tool. A grinding process is not a static process and the parameters influencing it change constantly. When grinding manually, these changes can be recognized by an experienced craftsman and necessary measures can be taken. He/She can also visually monitor the grinding results and manually adapt the grinding process accordingly. This possibility is not readily available in the case of a robot-supported grinding process.

It is therefore an object of the present invention to provide a robot-supported apparatus for abrasive machining that is constructed to satisfy the high precision demands placed on a modem abrasive process such as grinding and that can compensate dynamic changes throughout the duration of the process. A further object is to reduce the deployment of personnel for adjusting and monitoring tasks to a minimum.

SUMMARY

A robot-supported grinding method is described. In accordance with one example of the invention, the method comprises contacting the surface of a workpiece with a rotating grinding tool, whereby either the grinding tool or the workpiece is mechanically coupled to the tool-center-point of a manipulator. An actuator, influencing either the grinding tool or the workpiece, is controlled to generate a grinding force between the grinding tool and the workpiece. The method further comprises measuring an actual deflection of the actuator and adjusting a rotational velocity of the grinding tool dependent on the measured actual deflection of the actuator and a reference deflection of the actuator.

The rotational velocity of the grinding tool can be adjusted without interrupting the grinding process. The grinding tool may be a grinding wheel and its rotational velocity can be adjusted as wear progresses so that a wear-contingent reduction in the circumferential velocity of the grinding wheel is compensated by a corresponding increase in the rotational velocity. The rotational velocity of the grinding tool can also be adjusted according to a feed velocity of the grinding tool or the workpiece.

The grinding tool can be connected via the actuator to the tool-center-point (TCP) of the manipulator, so that the manipulator can position the grinding tool relative to the workpiece. The reference deflection can be calculated based on a measured actual deflection of the actuator. This is possible, e.g. in a situation in which the grinding tool with known dimensions contacts the surface of the workpiece. The reference deflection can also be calculated based on a known relative position of the workpiece surface relative to the TCP of the manipulator and a known dimension of the grinding tool. When the grinding tool contacts the surface of the workpiece, a current dimension of the grinding tool can be calculated based on a known relative position of the workpiece surface relative to the TCP of the manipulator and the actual deflection of the actuator, measured at the time the grinding tool contacts the surface of the workpiece.

When the measured actual deflection of the actuator reaches or exceeds a first threshold value, the manipulator can be control led so that the TCP moves toward the workpiece. The actuator is then controlled so that its deflection changes and the movement of the TCP is compensated by the change in the deflection of the actuator. The reference deflection is then adjusted dependent on the change in the deflection of the actuator.

An apparatus for robot-supported grinding is described below. In accordance with one example of the invention, the apparatus comprises the following: a manipulator, a grinding apparatus with a grinding tool and a force-controlled actuator that influences the grinding apparatus or a workpiece in order to generate a grinding force between grinding tool and workpiece surface. The grinding apparatus is provided with a velocity controller that is configured to adjust a rotational velocity of the grinding tool depending on a measured actual deflection of the actuator and a reference deflection.

The actuator can be mechanically coupled between a TCP of the manipulator and the grinding apparatus. Alternatively, the actuator can also be mechanically coupled between a TCP of the manipulator and the workpiece. The actuator can also be mechanically coupled between a fixed suspension and the grinding apparatus, in which case the workpiece can be positioned by the manipulator. Finally, the actuator can be mechanically coupled between a fixed suspension and the workpiece, in which case the grinding apparatus can be positioned by the manipulator.

Those skilled in the art will recognize additional features and advantages upon reading the following detailed description, and upon viewing the accompanying drawings.

BRIEF DESCRIPTION OF THE DRAWINGS

The invention is explained in greater detail below using the examples shown in the figures. The depictions are not necessarily true to scale and the invention is not only restricted to the shown aspects. Instead importance is placed on illustrating the underlying principles of the invention. In the figures, the same reference numerals designate the same or similar components, each having the same or similar meaning. In the figures.

DETAILED DESCRIPTION

Figure 1:
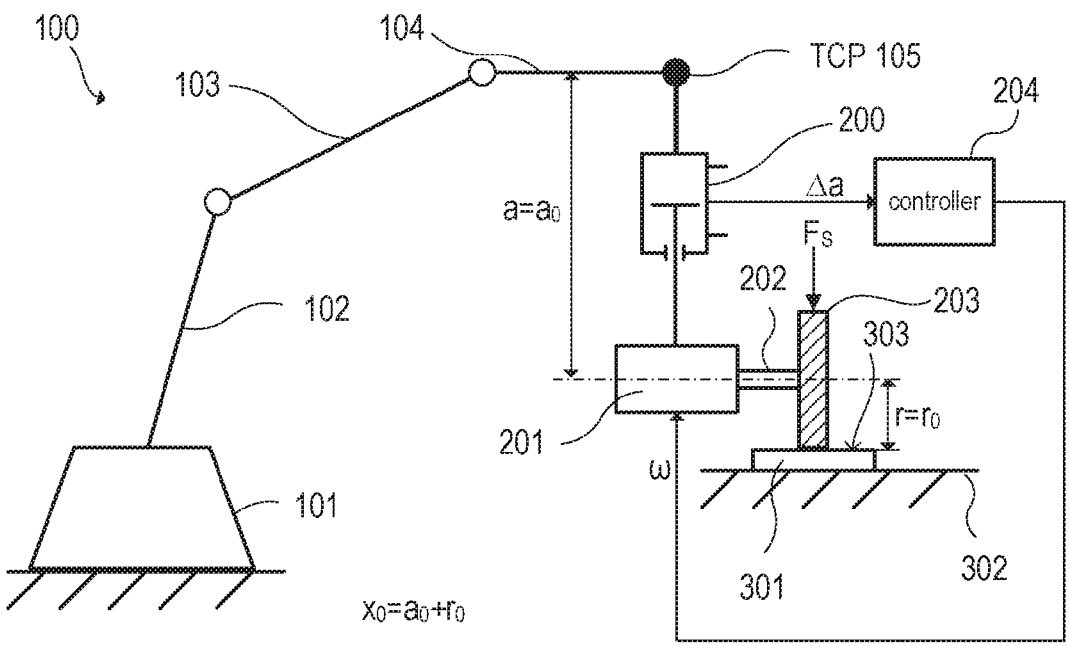
FIG. 1 illustrates a robot-supported grinding apparatus with a manipulator, a grinding tool and a control loop in a starting situation with an unworn grinding tool of known dimensions.

FIG. 1 shows schematically a robot-supported grinding apparatus with a manipulator 100 (standard industrial robot with a position-controlled tool center point TCP), a grinding tool 201 (grinding machine with grinding wheel 203), connected via an actuator 200 with the TCP, and a (rotational velocity) controller 204. In the shown example, the manipulator 100 is an industrial robot with six degrees of freedom (which, however, need not necessarily be the case). In accordance with FIG. 1, the manipulator comprises a fixed base 101, on which a first arm segment 102 is rotationally (azimuth angle) and pivotably (elevation angle) mounted. A second arm segment 103 is connected via a swivel joint with one degree of freedom to the end of the first arm segment 102 that is opposite the base 101. A third arm segment 104 is hinged on the (as seen from the base 101) far (distal) end of the second arm segment 103, also, for example, via a swivel joint with one degree of freedom. A biaxial swivel joint (with two degrees of freedom), connecting the TCP with the third arm segment 104, is usually found at the distal end of the third arm segment 104. The arrangement of the joints and arm segments can be vary, depending on the design of the manipulator 100, and is of no further significance for the present invention. The manipulator 100, however, should be capable of adjusting the position of the TCP and the orientation of the tool connected to the TCP relative to a surface 303 of a workpiece intended for machining, for which—in the case of a arbitrarily positionable workpiece—generally a manipulator with six degrees of freedom is required. If the positionability of the workpiece surface 303 is limited, then a manipulator 100 with less than six degrees of freedom will also suffice. Alternatively, the workpiece 301 can also be positioned by the manipulator 100 (cf. FIG. 4). In the present example, however, the workpiece 301 is arranged on a base 302 and, if needed (depending on the application), can be fixed.

The tool in the present case is a grinding wheel 203 driven by a driving unit (e.g. an electric motor 201 with rotary axis 202 or a compressed air motor), whereby the rotational velocity ω can be adjusted by means of a controller 204. The rotational velocity ω is usually measured in rad/s. As an alternative, it can also be indicated in rotations per second, and in this case it is designated by the symbol f (ω=2·π·f). The rotational velocity is often also indicated in revolutions per minute (ω=π·n/30, n designates the number of rotations per minute). The tool is connected to the TCP of the manipulator 100 by means of a further actuator 200, which can be controlled separately by the manipulator 100. The actuator 200 can be, for example, a pneumatic linear actuator and can be positioned and oriented by the manipulator 100 such that the effective orientation of the actuator 200 is essentially perpendicular to the workpiece surface 303. Instead of a pneumatic actuator, e.g. an electric direct drive (i.e. without transmission) or a drive based on some other functional principle may be considered. The actuator 200 serves to accurately adjust the grinding force $F_S$ that is applied by the grinding tool (grinding wheel 203) to the surface 303 of the workpiece 301. This means that the deflection of the actuator 200 is adjusted such that the grinding force $F_S$ assumes a desired target value. Thus, actuator 200 is not position-controlled, but rather force-controlled. In contrast to this, the position of the TCP of the manipulator 100 is determined by a controller or position regulator. That is, the manipulator 100 does not function force-controlled, but rather position-controlled, and the position of the TCP (within unavoidable tolerances) is therefore known to the manipulator controller (not separately shown).

The actuator 200 comprises a position sensor (generally integrated in the actuator), by means of which the current deflection (displacement) of the actuator 200 can be measured. In the present case, the deflection of the actuator 200 is defined as the distance between the TCP of the manipulator 100 and the rotational axis of the grinding wheel 203. In accordance with the present example, the sensor output is coupled to the controller 204, providing the measured deflection of the actuator to the controller as input value. The controller is configured to adjust the rotational velocity ω of the grinding wheel 203 in accordance with the measured deflection a. The rotational velocity control (i.e. the function of the controller 204) will be discussed in greater detail further on.

The case depicted in FIG. 1 shows a starting situation with (e.g. unworn) grinding tool 203 of known dimension. In the case of a grinding wheel, this dimension is the radius $r_0$ of the grinding wheel in an unworn state (diameter $d_0=2 \cdot r_0$). The deflection of the actuator 200 when an unworn grinding wheel 203 (radius r0) contacts the workpiece surface 303 will hereinafter be designated as reference deflection $a_0$. The circumferential velocity v(r) of the grinding wheel depends on the rotational velocity of the grinding wheel 203, whereas $$v(r_0)=\omega \cdot r_0=2 \cdot \pi \cdot f \cdot r_0. \quad (1)$$

Figure 2:
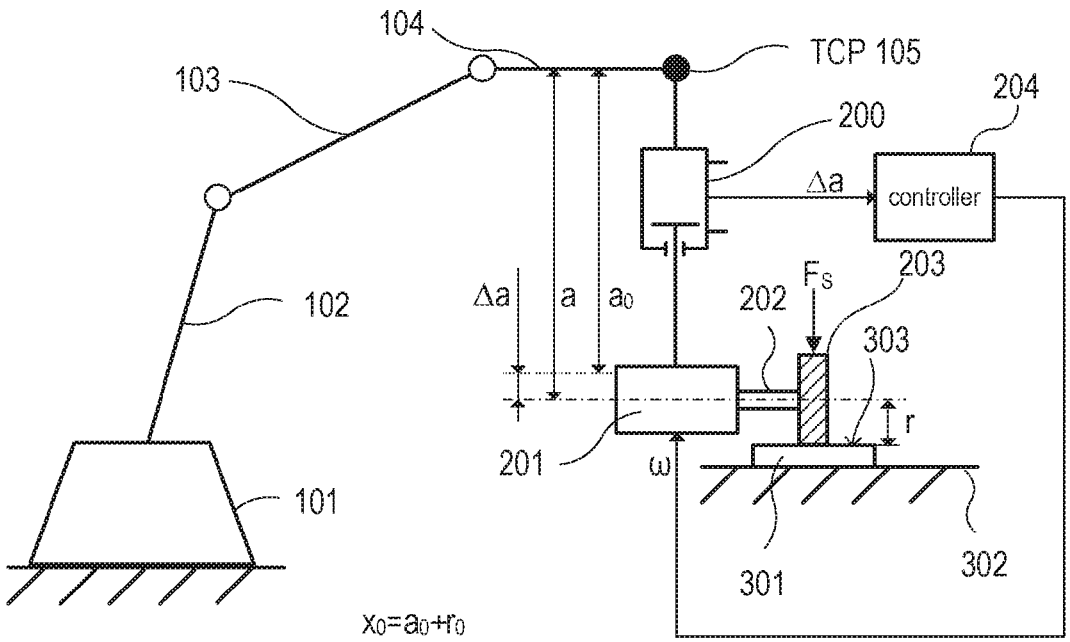
FIG. 2 illustrates the robot-supported grinding apparatus with manipulator, grinding tool, and control circuit of FIG. 1 in operation with a partially worn grinding tool.

In this case, f designates the number of rotations of the grinding wheel per second. At a rotational velocity of ω=ω₀, the circumferential velocity $v(r_0)$ is the same as the desired target value $v_0$ (reference value of the circumferential velocity). As operation progresses, the grinding wheel wears down and the radius of the grinding wheel is reduced from the initial value $r_0$ (reference radius) to the value r (whereas r<$r_0$). In order to maintain the force to the workpiece surface 202, the actuator 200 must compensate for the reduction in radius from $r_0$ to r by increasing the deflection of the actuator 200 accordingly, from the reference value $a_0$ to the value a (whereas a>$a_0$). The differences a-$a_0$ and $r_0$-r are identical when the actuator 200 influences the grinding wheel 203 without mechanical transmission. In FIG. 2 these differences are designated as Δa.

With a reduction in the radius of the grinding wheel 203 from $r_0$ to r, the circumferential velocity v of the grinding wheel 203 would be reduced from $v_0=v(r_0)=\omega_0 \cdot r_0$ to $v(r)=\omega_0 \cdot r$ (given a constant rotational velocity of ω=ω₀). The difference in velocity in this case amounts to:

$$\Delta v=v(r_0)-v(r)=\omega_0 \cdot (r_0-r)=\omega_0 \cdot \Delta a. \quad (2)$$

FIG. 2 and FIG. 1 are, with the exception of the diameter of the grinding wheel 203 and the associated larger deflection of the actuator 200, identical.

In practice, grinding wheels may be subject to intense wear. Grinding wheels with a diameter of 150 mm are frequently used until they have been worn down to a remaining diameter of 75 mm. Given a constant rotational velocity of the motor 201, in such a case the circumferential velocity of the grinding wheel would be half of what it was in the starting situation, which can negatively affect the result of the grinding process.

As mentioned above, the controller 204 is configured to adjust the rotational velocity ω so that the circumferential velocity remains at its reference value of $v_0=\omega_0 \cdot r_0$, whereby $r_0$ designates the referential radius of the grinding wheel (e.g. in an unworn state) and $\omega_0$ designates the rotational velocity of the grinding wheel that is needed to achieve the required (target) circumferential velocity of $v_0$ (in the case of a grinding wheel with a radius of $r_0$). When the rotational velocity and grinding wheel wear vary, the difference in velocity mentioned above is $\Delta v = \omega_0 \cdot r_0 - \omega \cdot r$. In order to fulfill the condition of $\Delta v = 0$ (constant circumferential velocity), the following condition must be met:

$$\omega_0 \cdot r_0 = \omega \cdot r. \qquad (3)$$

The following then applies for the current rotational velocity:

$$\omega = \omega_0 \cdot (r_0/r), \qquad (4)$$

whereby when the grinding wheel wears, the ratio $r_0/r$ is always larger than one. Given the following relation described above $$r = r0 - \Delta a, \qquad (5)$$

the following results from the Equation 4:

$$\omega = \omega_0 \cdot (r_0/(r_0 - \Delta a)), \qquad (6)$$

whereby the change $\Delta a$ can be directly measured by means of the position sensor integrated in actuator 200. The controller 204 can therefore control the rotational velocity in accordance with the equation 6 depending on the change $\Delta a$ in the deflection of the actuator so that the circumferential velocity $v(r)$ of the grinding wheel 203 constantly remains at the value $v_0 = \omega_0 \cdot r_0$, i.e. the condition $\Delta v = 0$ is fulfilled.

In order to determine the change $\Delta a$ in the actuator deflection, the starting value $a_0$ of the actuator deflection that is given in the case of an unworn grinding wheel 203 (radius $r = r_0$) needs to be either known or measured. It is possible to measure the starting value $a_0$ of the actuator deflection when the workpiece surface 303 of the workpiece 301 is contacted by an unworn grinding tool (grinding wheel with the radius $r_0$). The controller (force regulation) of the actuator 200 is configured to recognize a contact between the workpiece surface 303 and the grinding tool 203. In this case, the current deflection a of the actuator 200 at the time the contact is recognized is recorded as reference deflection $a_0$. In such a case (radius of the grinding wheel equals reference radius, i.e. $r = r_0$), the position of the workpiece surface 303 relative to the TCP of the manipulator 100 need not be exactly known.

How the controller of the actuator 200 can recognize a contact between the workpiece surface 303 and the grinding wheel 203 is, in principle, known and is only briefly summarized here. With no resistance (i.e. when contact is absent) the controller (not shown) will control the actuator 200 such that it assumes a maximum deflection that is limited by an end stop. The actuator 200 then presses with a (relatively small) target force, determined by the controller, against the end stop. As soon as the grinding wheel 203 contacts the workpiece surface 303 (because the grinding machine is moved by means of the manipulator 100 along a predetermined trajectory toward the workpiece 301), the actuator will yield and the deflection of the actuator will change.

As soon as the TCP of the manipulator 100 (and with it the grinding machine) has reached the desired position, the current actuator deflection a—at the time the grinding tool contacts the workpiece surface—can be recorded as reference value $a_0$. In this case, the exact relative position of the workpiece to the TCP of the manipulator 100 need not be known, as any deviations from a (theoretically) ideal position can be compensated—within certain limits—by the actuator 200. The position of the workpiece surface 303 inevitably arises from the sum of the (measured) reference deflection $a_0$ and the reference radius $r_0$. Whereas the actual radius r of the grinding wheel 203 corresponds to the reference radius $r_0$.

If the position and orientation of the workpiece relative to the TCP is known, then—provided the reference radius $r_0$ of the grinding wheel 203 is known—the reference value $a_0$ can be relatively easily calculated from the known standard distance $x_0$ between the workpiece surface 303 and the TCP of the manipulator 100. In this case, the reference value $a_0$ for the actuator deflection is $a_0 = x_0 - r_0$. As soon as the grinding wheel with (a priori unknown) radius r contacts the workpiece surface, the actual radius r can be calculated from the actual actuator deflection a ($a = a_0 + \Delta a$) and the known standard distance $x_0$ ($r = x_0 - a$). In this case the reference radius $r_0$ of the grinding wheel and the position $x_0$ of the workpiece must therefore be known at the beginning of the grinding process. However, the actual radius r of the grinding wheel 203 can be determined (as described above) by measuring the actuator deflection at the time at which the grinding wheel 203 contacts the surface 303 of the workpiece in its known position of $x_0$ ($r = x_0 - a$). Depending on the current radius r, the controller 204 will then set (using Equation 6) the appropriate rotational velocity $\omega$ in order to maintain the desired circumferential velocity $v_0$.

During operation of the grinding apparatus, the manipulator 100 can be controlled such that a change $\Delta a$ of the initial actuator deflection $a_0$ is at least partially compensated for. When abrasion reduces the radius of the grinding wheel 203 by, e.g. 50 mm, the current actuator deflection becomes 50 mm greater than it was before (when the grinding wheel was new). In order to return the actuator to its initial position (deflection $a_0$), the TCP of the manipulator 100 can be moved closer to the workpiece by the aforementioned 50 mm (in general $\Delta a$), thereby reducing the actuator deflection accordingly. At the same time, the reference value $a_0$ is adjusted in accordance with the shift in the TCP. In this way it can be ensured that the actuator deflection a does not exceed a given maximum value. Alternatively, a subsequent change in the position of the TCP of the manipulator can be taken into consideration in the deflection a of the actuator 200.

Figure 3:
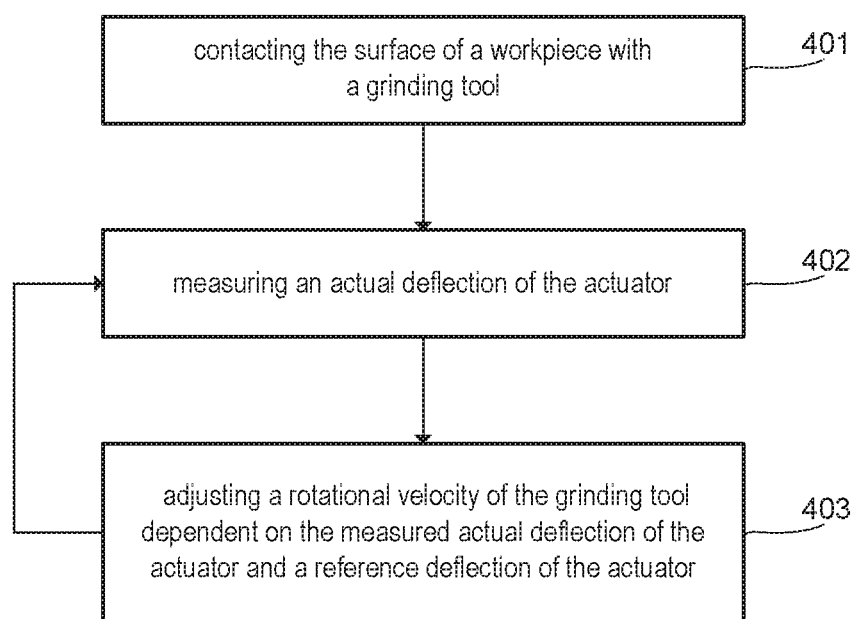
FIG. 3 is a flowchart of an example of the method in accordance with the invention.

FIG. 3 shows, using a flowchart, a simple example of the robot-supported method in accordance with the invention. First, the grinding machine is moved by means of the manipulator 100 toward the workpiece so that the workpiece surface 303 contacts the rotating grinding tool 203, which is connected to the Tool-Center-Point (TCP) of the manipulator 100 via the actuator 200 (Step 401). After contact recognition, the current actual deflection a of the actuator 200 is measured (Step 402). For this purpose the actuator 200 generally includes a path sensor. During the grinding process, the rotational velocity $\omega$ of the grinding tool 203 is adjusted, continuously or at a certain time intervals, dependent on the measured actual deflection a of the actuator 200 and a reference deflection $a_0$ (Step 403). This adjustment is carried out, e.g. using the aforementioned Equation 6.

The reference deflection $a_0$ is either known or can be calculated because the position xo of the workpiece relative to the TPC of the manipulator 100 and the nominal radius $r_0$ of the grinding wheel 203 are known. In this case, as described above, the actual radius r of the grinding wheel can be calculated from the actual deflection a upon contact. If the position $x_0$ of the workpiece relative to the TPC of the manipulator 100 is not exactly known, the reference deflection $a_0$ can be calculated, as described above, from the actual measured deflection a given at the time of contact. This, however, is contingent on the radius $r_0$ of the grinding wheel being known when the deflection a upon contact is measured.

As mentioned above, the manipulator 100 is only position-controlled and moves the grinding machine (motor 201, grinding wheel 203) along a stipulated trajectory (planned in advance). This is, for example, defined by a series of positions (location and orientation) of the manipulator's TCP. The controller of the manipulator (robot control) need not "occupy itself" with recognizing the contact between grinding wheel 203 and workpiece surface 303, or with controlling the grinding force $F_S$. The velocity controller 204 also operates independently and requires as input value only the actuator deflection a or its change Δa. During the grinding process, the manipulator can be controlled such that its TCP (and with it the grinding machine) moves along a determined trajectory (e.g. parallel to the workpiece surface). In this case, the circumferential velocity $v(r)$ or $v(r_0)$ of the grinding wheel 203 (cf. Equation 1) is superposed over the feed velocity $v_F$ of the grinding tool. In this case, the condition Δv=0 (cf. Equation 3) results in $$\omega_0 \cdot r_0 = \omega \cdot r + v_F \quad (7)$$

and $$\omega = \omega_0 \cdot (r_0/(r_0 - \Delta a)) - v_F/(r_0 - \Delta a). \quad (8)$$

This means that the rotational velocity ω will be additionally corrected by the value of $v_F/(r_0-\Delta a)$ in order to compensate for the influence of the feed velocity.

Figure 4:
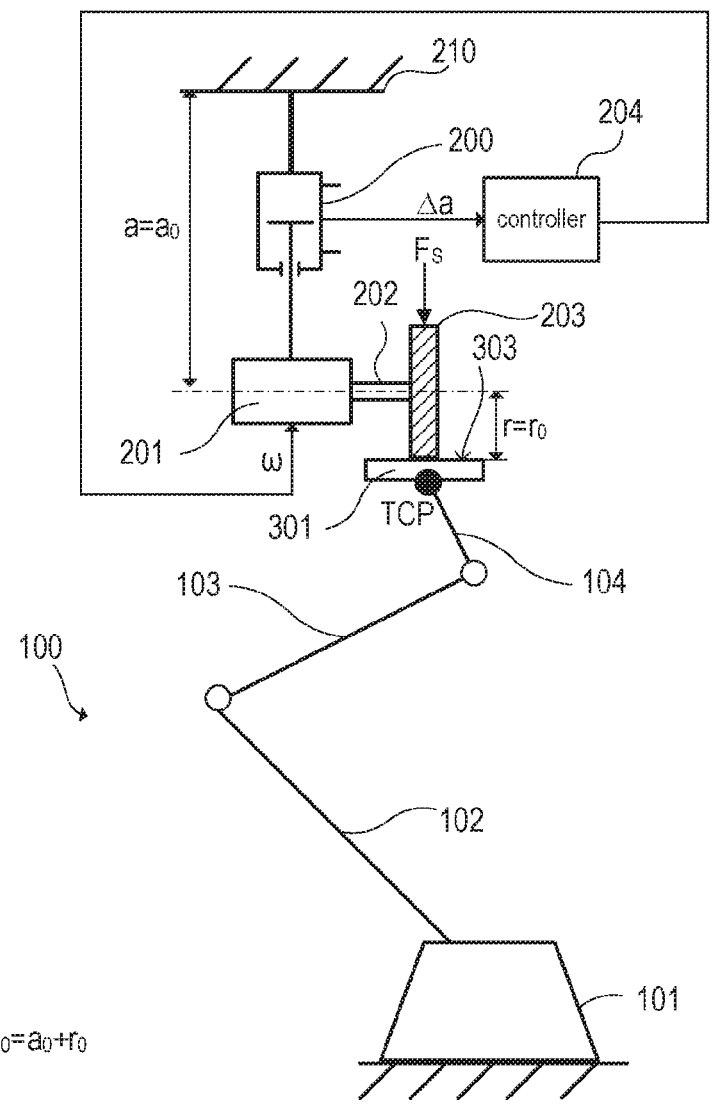
FIG. 4 illustrates an alternative to the situation depicted in FIG. 1, in which the workpiece is moved by a manipulator.

In the examples described so far, the actuator 200 and the grinding machine (motor 201, grinding wheel 203) were positioned by the manipulator 100 relative to a workpiece 301. Alternatively, the grinding machine can be mounted on a fixed suspension 210 via the actuator 200, in which case the workpiece is positioned by the manipulator 100. This situation is shown in FIG. 4. As only the relative position $x_0$ between the workpiece and actuator 200 is important, it does not matter whether the actuator 200 (together with the grinding machine) or the workpiece is actively positioned by the manipulator. Except for the fact that the workpiece 301 is actively positioned by the manipulator 100 (instead of the actuator 200), the example shown in FIG. 4 is identical to the one shown in FIG. 1. For a detailed explanation of the shown components, reference is therefore made to the FIGS. 1 to 3 and the corresponding description.

In a further alternative, the workpiece is mounted via the actuator 200 on the TCP of the manipulator 100 and the grinding machine rests on a firm base. This variation corresponds to the example in FIG. 1, whereby grinding machine and workpiece exchange positions. In another alternative, the workpiece would be connected to a fixed suspension via the actuator 200 and the grinding machine is positioned by the manipulator 100. This variation corresponds to the example in FIG. 4, whereby grinding machine and workpiece exchange positions.

While various embodiments of the invention have been described, it will be apparent to those of ordinary skill in the art that many more embodiments and implementations are possible within the scope of the invention. With regard to the various functions performed by the components or structures described above assemblies, devices, circuits, systems, etc.), the terms eluding a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A robot-supported abrasive machining method, comprising:
    contacting a surface of a workpiece with a rotating grinding tool, whereby either the grinding tool or the workpiece is mechanically coupled to a tool-center-point (TCP) of a manipulator;
    controlling an actuator that influences the grinding tool or the workpiece so as to generate a grinding force between the grinding tool and the workpiece;
    measuring an actual deflection of the actuator; and
    adjusting a rotational velocity of the grinding tool dependent on the measured actual deflection of the actuator and a reference deflection of the actuator.

2. The method of claim 1, wherein the grinding tool is connected to the TCP of the manipulator via the actuator, so that the manipulator can position the grinding tool relative to the workpiece.

3. The method of claim 1. wherein the grinding tool has a known dimension, the method further comprising determining the reference deflection by:
    calculating the reference deflection based on the measured actual deflection of the actuator when the grinding tool with the known dimension contacts the workpiece surface.

4. The method of claim 1, further comprising determining the reference deflection by:
    calculating the reference deflection based on a known relative position of the workpiece surface relative to the TCP of the manipulator and a known dimension of the grinding tool.

5. The method of claim 1, further comprising:
    calculating a current dimension of the grinding tool based on a known relative position of the workpiece surface relative to the TCP of the manipulator and the measured actual deflection of the actuator at the time the grinding tool contacts the surface of the workpiece.

6. The method of claim 1, wherein responsive to the measured actual deflection of the actuator reaching or exceeding a first threshold value, the method further comprises:
    controlling the manipulator such that the TCP moves toward the tool;
    controlling the actuator such that its deflection changes so that the movement of the TCP is compensated by the change in the deflection of the actuator; and
    adjusting the reference deflection in accordance with the change in the deflection of the actuator.

7. The method of claim 1, wherein the rotational velocity of the grinding tool is adjusted without interrupting the abrasive machining process.

8. The method of claim 1, wherein the grinding tool is a grinding wheel, and wherein case of wear to the grinding wheel, the rotational velocity of the grinding wheel adjusted to compensate a wear-related reduction in the circumferential velocity of the grinding wheel by a corresponding increase in the rotational velocity.

9. The method of claim 1, wherein the rotational velocity of the grinding tool also is adjusted dependent on a feed velocity of the grinding tool or of the workpiece.

\* \* \* \* \*